United States Patent
Nakaba et al.

(10) Patent No.: US 6,851,535 B2
(45) Date of Patent: Feb. 8, 2005

(54) DRIVING FORCE TRANSMISSION DEVICE AND METHOD OF REGULATING IT

(75) Inventors: Hiroyuki Nakaba, Kariya (JP); Hideyuki Saito, Kariya (JP)

(73) Assignee: Toyoda Koki Kabushiki Kaisha, Kariya (JP)

(*) Notice: Subject to any disclaimer, the term of this patent is extended or adjusted under 35 U.S.C. 154(b) by 0 days.

(21) Appl. No.: 10/343,830

(22) PCT Filed: Aug. 30, 2001

(86) PCT No.: PCT/JP01/07471
§ 371 (c)(1),
(2), (4) Date: Feb. 10, 2003

(87) PCT Pub. No.: WO02/018810
PCT Pub. Date: Jul. 3, 2002

(65) Prior Publication Data
US 2003/0173180 A1 Sep. 18, 2003

(30) Foreign Application Priority Data
Aug. 31, 2000 (JP) .................. 2000-263571

(51) Int. Cl.[7] .............................. F16D 27/00
(52) U.S. Cl. .............. 192/35; 192/84.5; 192/84.96
(58) Field of Search ............... 192/35, 55.7, 84.5, 192/54.96

(56) References Cited

U.S. PATENT DOCUMENTS

| 6,109,408 A | * | 8/2000 | Ikeda et al. ............ 192/35 |
| 6,578,684 B2 | * | 6/2003 | Yamamoto et al. ...... 192/35 |
| 6,585,093 B2 | * | 7/2003 | Hara et al. ............ 192/35 |
| 2002/0079178 A1 | * | 6/2002 | Takuno et al. .......... 192/35 |

FOREIGN PATENT DOCUMENTS

| EP | 0856676 | 8/1998 |
| JP | 10-329562 | 12/1998 |

* cited by examiner

Primary Examiner—Charles A. Marmor
Assistant Examiner—Eric M. Williams
(74) Attorney, Agent, or Firm—Oblon, Spivak, McClelland, Maier & Neustadt, P.C.

(57) ABSTRACT

A tuning method for the exciting current-transmission torque characteristic of a power transmission apparatus is provided. A yoke (36), which supports an electromagnet (33), is accommodated in a groove (53) and is apart from the groove by a first distance (L2) and a second distance (L4). The exciting current-transmission torque characteristic is tuned by varying the first distance while keeping the second distance fixed. When the first distance is varied, the variation of the magnetoresistance of a magnetic path is relatively small. Therefore, the exciting current-transmission torque characteristic is more accurately tuned.

2 Claims, 4 Drawing Sheets

DRIVING FORCE TRANSMISSION DEVICE AND METHOD OF REGULATING IT

BACKGROUND OF THE INVENTION

1. Field of the Invention

The present invention relates to a power transmission apparatus, and more specifically, to a power transmission apparatus that has an electromagnetic friction clutch and a method for tuning the power transmission apparatus.

2. Discussion of the Background

Japanese Laid-Open Patent Publication No. 11-153159 discloses a conventional power transmission apparatus. The power transmission apparatus includes inner and outer rotary members, which are coaxially arranged with and rotate relative to each other, an annular friction clutch, which is located between the inner rotary member and the outer rotary member, and an electromagnetic drive apparatus, which drives the friction clutch when energized by current supply.

The electromagnetic drive apparatus has an annular armature, which is arranged to face the friction clutch, and an annular electromagnet, which is arranged to face the friction clutch with part of the outer rotary member located in between. When the electromagnet is energized, the armature is attracted to the electromagnet and causes friction with the friction clutch. Thus, the inner and outer rotary members are coupled with each other via the friction clutch to transmit torque.

The electromagnet is supported by an annular electromagnet support formed on a yoke. The electromagnet support and the electromagnet are accommodated in an annular groove formed at part of the outer rotary member. Predetermined outer and inner clearances are located between the electromagnet support and the annular groove. More specifically, the outer circumferential surface of the electromagnet support is apart from one side of the annular groove by a predetermined first distance. The inner circumferential surface of the electromagnet support is apart from the other side of the annular groove by a predetermined second distance.

When exciting current is supplied to the electromagnet, a magnetic path that circulates the yoke, the outer clearance, part of the outer rotary member, the friction clutch, the armature, the friction clutch, part of the outer rotary member, the inner clearance, and the yoke is generated. The armature is attracted toward the electromagnet by the operation of the magnetic induction and depresses the friction clutch. Thus, the outer rotary member and the inner rotary member are coupled to each other to transmit torque.

In an assembling procedure of the power transmission apparatus, the inner rotary member, the armature, and the friction clutch are mounted inside the outer rotary member. The yoke to which the electromagnet is attached is assembled in the last process.

In the assembling procedure of the yoke, an operator selects one of yokes having several sizes and mounts the yoke to the outer rotary member. Then, a conduction test of the electromagnet is performed to measure the exciting current/transmission torque characteristic. If the characteristic is undesirable, the operator changes the yoke with other yoke having different size that provides satisfactory exciting current/transmission torque characteristic.

The exciting current/transmission torque characteristic refers to the relationship between the exciting current supplied to the electromagnet (electromagnetic coil) and the torque transmitted from the outer rotary member to the inner rotary member.

Each yoke is formed such that the outer clearance and the inner clearance will be equal. More specifically, the inner circumferential surface and the outer circumferential surface of each yoke are cut such that the first and the second distances will be equal. Therefore, the manufacturing process of the yokes of the conventional power transmission apparatus is troublesome. Also, the tuning variation of the exciting current/transmission torque characteristic is relatively large.

SUMMARY OF THE INVENTION

Accordingly, it is an objective of the present invention to provide a power transmission apparatus that has reduced exciting current/transmission torque characteristic variation. Another objective of the present invention is to provide a tuning method for easily tuning the exciting current/transmission torque characteristic of the power transmission apparatus.

To achieve the above objective, the present invention provides a power transmission apparatus, which includes an outer rotary member and an inner rotary member. The outer rotary member has a groove. The inner rotary member is located inside the outer rotary member and rotates relative to the outer rotary member. A friction clutch is located between the inner and outer rotary members. An electromagnetic drive apparatus drives the friction clutch when receiving an exciting current. The electromagnetic drive apparatus includes an electromagnet that is energized by the exciting current and an armature, the electromagnet and the armature being located on opposite sides of the friction clutch. Part of a yoke, which supports the electromagnet, and the electromagnet are located in the groove. A first clearance and a second clearance are formed between the yoke and the groove. The energized electromagnet generates a magnetic path, which extends through the yoke, part of the outer rotary member, the first clearance, the armature, the second clearance, and the yoke; and attracts the armature such that the armature engages with the friction clutch by a predetermined frictional force. When the armature engages with the friction clutch, the inner rotary member is operably coupled to the outer rotary member to transmit the torque. A cross-sectional area of the magnetic path at the first clearance is greater than a cross-sectional area of the magnetic path at the second clearance. A first distance between the yoke and the groove at the first clearance differs from a second distance between the yoke and the groove at the second clearance.

The first distance is greater than the second distance in one embodiment, and the first distance is less than the second distance in the other embodiment.

The present invention also provides a tuning method for the exciting current-transmission torque characteristic of a power transmission apparatus. The power transmission apparatus includes an outer rotary member, an inner rotary member, a friction clutch, an electromagnetic drive apparatus, and a yoke. The outer rotary member has a groove. The inner rotary member is arranged to rotate relative to the outer rotary member. The friction clutch is located between the inner and outer rotary members. The electromagnetic drive apparatus drives the friction clutch when receiving an exciting current. The electromagnetic drive apparatus includes an electromagnet that is energized by the exciting current and an armature, the electromagnet and the armature being located on opposite sides of the friction clutch. The yoke supports the electromagnet. Part of the yoke and the electromagnet are located in the groove. A first clearance and a second clearance are formed between the yoke and two opposing inner surfaces of the groove. The tuning method includes changing a first distance between the yoke and the groove at the first clearance while maintaining a second distance between the yoke and the groove at the second clearance constant.

Other aspects and advantages of the invention will become apparent from the following description, taken in conjunction with the accompanying drawings, illustrating by way of example the principles of the invention.

DESCRIPTION OF THE PREFERRED EMBODIMENTS

A power transmission apparatus 11 according to one embodiment of the present invention will now be described.

Figure 2:
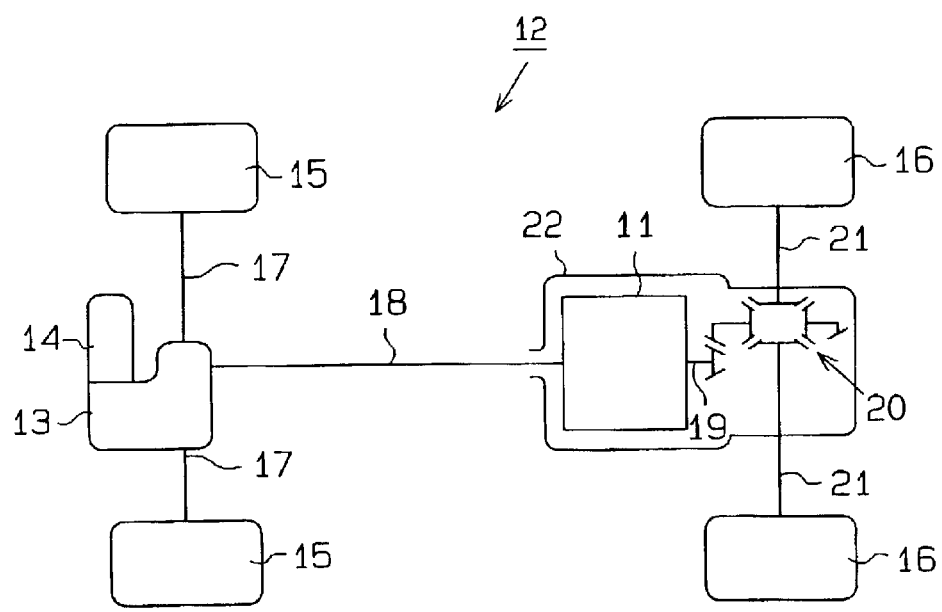
FIG. 2 is an explanatory diagram illustrating a four-wheel drive vehicle equipped with the power transmission apparatus shown in FIG. 1.

As shown in FIG. 2, the power transmission apparatus 11 is located in, for example, a power transmission path to rear wheels of a four-wheel drive vehicle 12.

The four-wheel drive vehicle 12 includes the power transmission apparatus 11, a transaxle 13, an engine 14, front wheels 15, and rear wheels 16. Power of the engine 14 is transmitted to the front wheels 15 by the transaxle 13 and axle shafts 17.

The transaxle 13 is coupled to the power transmission apparatus 11 by a propeller shaft 18. The power transmission apparatus 11 is coupled to a rear differential gear 20 by a drive pinion shaft 19. The rear differential gear 20 is coupled to the rear wheels 16 by axle shafts 21. When the propeller shaft 18 and the drive pinion shaft 19 are coupled to each other by the power transmission apparatus 11 to transmit torque, the power of the engine 14 is transmitted to the rear wheels 16.

The power transmission apparatus 11 and the rear differential gear 20 are accommodated in a differential carrier 22, which is supported by the vehicle body.

The power transmission apparatus 11 is described below.

Figure 1:
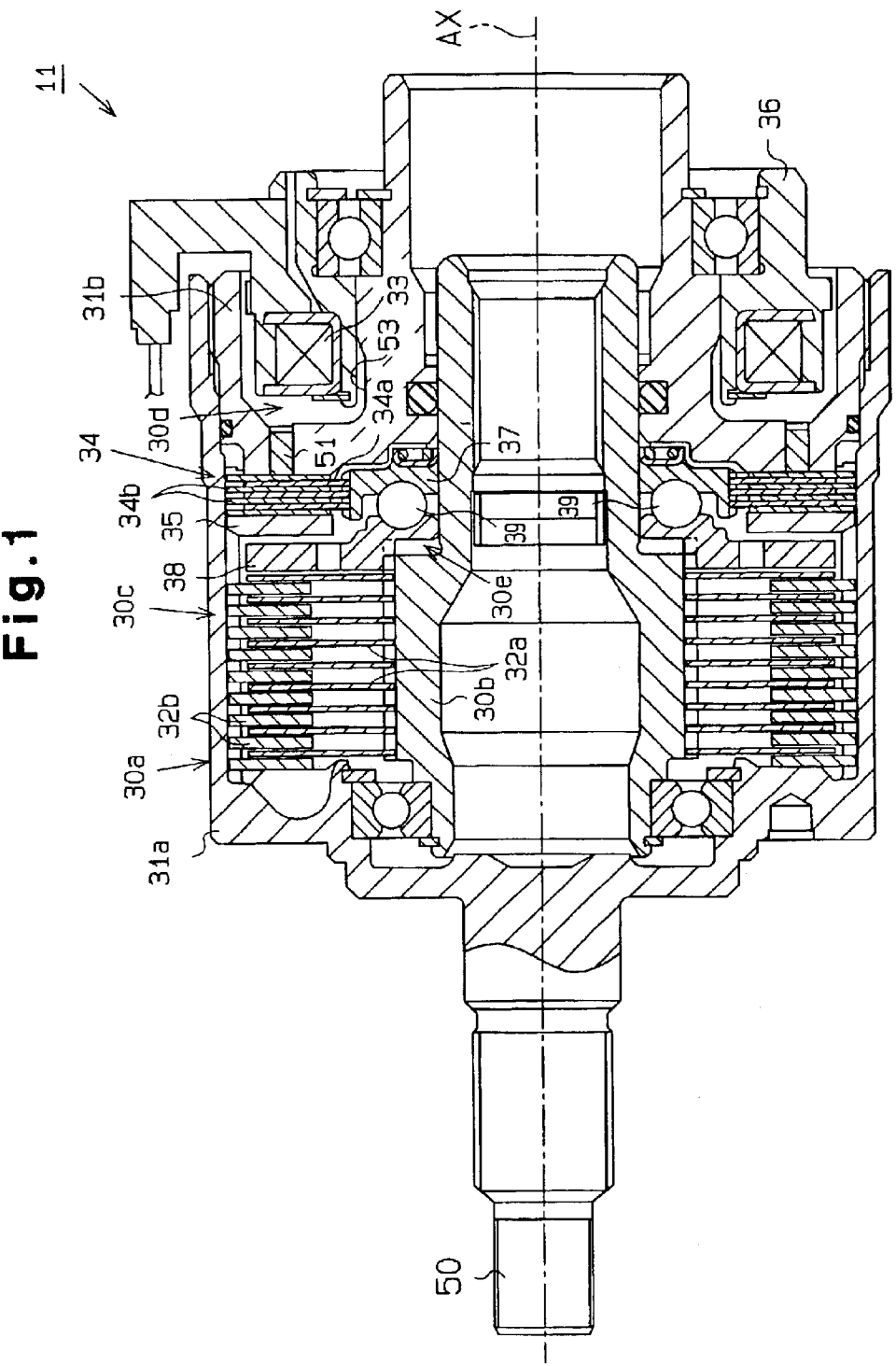
FIG. 1 is a partial cross-sectional view illustrating a power transmission apparatus according to one embodiment of the present invention.

As shown in FIG. 1, the power transmission apparatus 11 includes an outer rotary member, or an outer case 30a, an inner rotary member, or an inner shaft 30b, a main clutch mechanism 30c, a pilot clutch mechanism 30d, and a cam mechanism 30e.

The outer case 30a includes a closed end, a cylindrical front housing member 31a, and a rear housing member 31b.

The closed end is formed at the left side (front side) as viewed in FIG. 1. The cylindrical front housing member 31a has an opening at the right side (rear side) as viewed in FIG. 1. The rear housing member 31b is attached to the front housing member 31a to close the opening of the front housing member 31a. The rear housing member 31b is arranged perpendicular to the axis AX of the power transmission apparatus 11 and serves as the wall member of the outer rotary member. An input shaft 50 is integrally formed with the front housing member 31a and project from the front end of the front housing member 31a. The input shaft 50 is coupled to the propeller shaft 18.

In the preferred embodiment, the front housing member 31a and the rear housing member 31b are made of magnetic material, which is iron in this embodiment. A cylinder 51 is buried at a radially middle portion of the rear housing member 31b. The cylinder 51 is made of nonmagnetic material, which is stainless steel in this embodiment.

The yoke 36 is supported by the differential carrier 22 (see FIG. 2). The outer case 30a is rotatably supported by the differential carrier 22 by a bearing located between the yoke 36 and the rear housing member 31b and a bearing (not shown) attached to the outer circumferential surface of the front housing member 31a.

The inner shaft 30b is supported by the front housing member 31a and the rear housing member 31b. The inner shaft 30b is prevented from moving in the axial direction and rotates relative to the front housing member 31a and the rear housing member 31b. A space defined between the inner shaft 30b and the front housing member 31a and the rear housing member 31b is sealed in a fluid-tight manner. The inner shaft 30b is coupled to the drive pinion shaft 19 (see FIG. 2).

Figure 3:
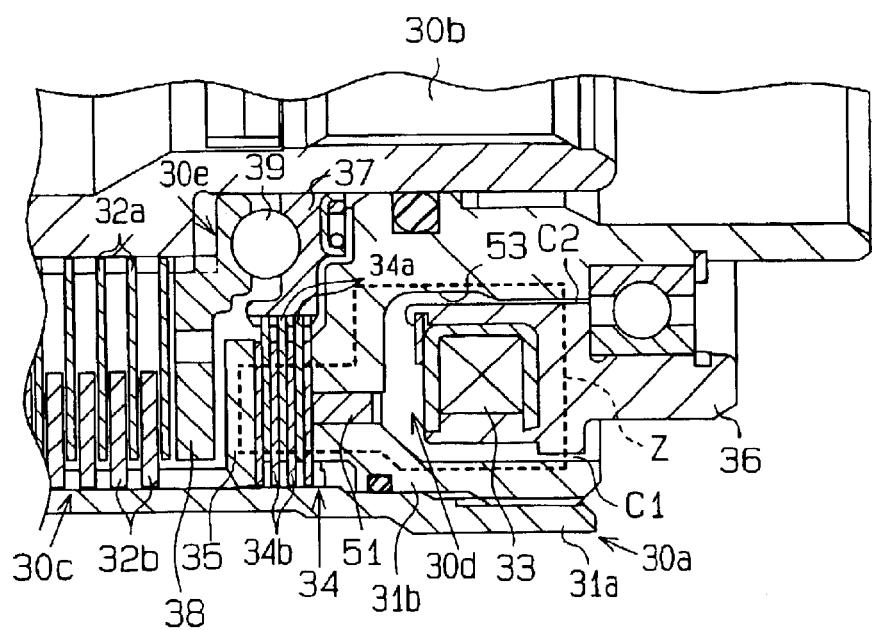
FIG. 3 is an enlarged cross-sectional view illustrating the power transmission apparatus shown in FIG. 1.

As shown in FIGS. 1 and 3, the main clutch mechanism 30c is a multiplate wet clutch mechanism that includes inner clutch plates 32a and outer clutch plates 32b. The main clutch 30c is located adjacent to the closed end of the front housing member 31a. The inner clutch plates 32a form a friction clutch mechanism.

The inner clutch plates 32a are mounted to the outer surface of the inner shaft 30b by spline fitting, and are movable in the axial direction with respect to the inner shaft 30b. The outer clutch plates 32b are mounted to the inner surface of the front housing member 31a by spline fitting, and are movable in the axial direction with respect to the front housing member 31a. The inner clutch plates 32a and the outer clutch plates 32b are alternately arranged. The inner clutch plates 32a and the outer clutch plates 32b are selectively arranged at a friction position where the inner clutch plates 32a and the outer clutch plates 32b abut against and engage with each other and a free position where the inner clutch plates 32a and the outer clutch plates 32b are separate and disengaged from each other.

The pilot clutch mechanism 30d includes an electromagnet 33, a friction clutch 34, and an armature 35. The electromagnet 33 and the armature 35 form a drive apparatus.

The differential carrier 22 has an inner surface, which fits with the outer surface of the yoke 36. The yoke 36 is supported by the differential carrier 22 such that the yoke 36 rotates relative to the rear housing member 31b. The annular electromagnet 33 is attached to the yoke 36. The electromagnet 33 is accommodated in an annular groove 53, which is formed in the rear housing member 31b about the axis AX. As shown in FIG. 3, a first (outer) clearance C1 and a second (inner) clearance C2 are defined between the yoke 36 and the annular groove 53. In other words, the outer circumferential surface of the yoke 36 and the rear housing member 31b (annular groove 53) are apart from each other by a first distance at the first clearance C1. The inner circumferential surface of the yoke 36 and the rear housing member 31b (annular groove 53) are apart from each other by a second distance at the second clearance C2. The first distance is designed to be greater than the second distance in the preferred embodiment.

The first clearance C1 extends along the entire outer circumferential surface of the yoke 36 and the second clearance C2 extends along the entire inner circumferential surface of the yoke 36. As shown by a dotted line in FIG. 4, a magnetic path Z extends through the first clearance C1 between the outer circumferential surface of the yoke 36 and the annular groove 53 and retains through the second clearance C2 between the inner circumferential surface of the yoke 36 and the groove 53. Hereinafter, the cross-sectional area of the magnetic path Z at the first clearance C1 is referred to as a first clearance cross-sectional area S2, and the cross-sectional area of the magnetic path Z at the second clearance C2 is referred to as a second clearance cross-sectional area S4. In the preferred embodiment, the yoke 36 and the rear housing member 31b (annular groove 53) are formed such that the first clearance cross-sectional area S2 is greater than the second clearance cross-sectional area S4.

The multiplate friction clutch 34 includes inner clutch plates 34a and outer clutch plates 34b. The inner clutch plates 34a are mounted to the outer circumferential surface of a first cam member 37 of the cam mechanism 30e by spline fitting, and are movable in the axial direction with respect to the first cam member 37. The outer clutch plates 34b are mounted to the inner circumferential surface of the front housing member 31a by spline fitting, and are movable in the axial direction with respect to the front housing member 30a.

The inner clutch plates 34a and the outer clutch plates 34b are alternately arranged. The inner clutch plates 34a and the outer clutch plates 34b are selectively arranged at a friction position where the inner clutch plates 34a and the outer clutch plates 34b abut against and engage with each other and a free position where the inner clutch plates 34a and the outer clutch plates 34b are separate and disengaged from each other.

The armature 35 has an annular shape and is mounted to the inner circumferential surface of the front housing member 31a by spline fitting such that the armature 35 is movable in the axial direction with respect to the front housing member 31a. The armature 35 is located in front of (leftward as viewed in FIG. 1) the friction clutch 34.

As shown in FIG. 3, when the electromagnetic coil of the electromagnet 33 is energized, the magnetic path Z that circulates through the yoke 36, the first clearance C1, the rear housing member 31b, the friction clutch 34, the armature 35, the friction clutch 34, the rear housing member 31b, the second clearance C2, and the yoke 36 is generated.

As shown in FIGS. 1 and 3, the cam mechanism 30e includes the first cam member 37, a second cam member 38, and a cam follower 39.

The first cam member 37 and the second cam member 38 are arranged to face each other. Cam grooves are formed on the opposing surface of each of the first and second cam members 37, 38 at predetermined intervals in the circumferential direction. Each cam groove extends in the radial direction. The distance between the bottom of the cam groove of the first cam member 37 and the bottom of the cam groove of the opposing second cam member 38 varies in the radial direction. The spherical cam follower 39 is arranged between the opposing cam grooves.

The first cam member 37 is attached to the inner shaft 30b and rotates relative to the inner shaft 30b. The first cam member 37 is also supported by the rear housing member 31b and rotates relative to the rear housing member 31b. The inner clutch plates 34a are mounted to the outer circumferential surface of the first cam member 37 by spline fitting.

The second cam member 38 is mounted to the outer circumferential surface of the inner shaft 30b by spline fitting, and rotates integrally with the inner shaft 30b. The second cam member 38 is arranged to face the inner clutch plates 32a of the main clutch mechanism 30c.

The friction clutch 34 and the wall member, which is part of the rear housing member 31b, are arranged between the armature 35 and the electromagnet 33. Therefore, the magnetic path Z passes through part of the rear housing member 31b.

The rear housing member 31b is fitted to the outer circumference of the inner shaft 30b to rotate relative to the inner shaft 30b, and is secured to the front housing member 31a. An oil seal, which is not shown, is attached to the outer circumferential surface of a coupling cylinder portion formed at the rear of the rear housing member 31b. The oil seal rotatably supports the rear housing member 31b inside the differential carrier 22 in a fluid-tight manner.

When the electromagnet 33 is not energized, the magnetic path Z is not formed at the pilot clutch mechanism 30d. Thus, the friction clutch 34 is in a disengaged state and the pilot clutch mechanism 30d is not operating. At this time, the first cam member 37 rotates integrally with the second cam member 38 via the cam follower 39, and the main clutch mechanism 30c is not operating. In this case, the four-wheel drive vehicle 12 travels in the two-wheel drive mode.

On the other hand, when a predetermined first exciting current is supplied to the electromagnet 33, the magnetic path Z is formed at the pilot clutch mechanism 30d. Thus, the electromagnet 33 attracts the armature 35. Accordingly, the inner clutch plates 34a and the outer clutch plates 34b are engaged by a predetermined frictional force. Therefore, the first cam member 37 is coupled to the front housing member 31a by the friction clutch 34 and rotates relative to the second cam member 38.

The cam follower 39 moves along the cam groove in accordance with the relative rotational speed of the first and the second cam members 37, 38 and presses the first and second cam members 37, 38 to separate from each other. The cam follower 39 presses the second cam member 38 forward and causes friction at the main clutch mechanism 30c with force corresponding to the frictional force of the friction clutch 34. Thus, torque is transmitted between the outer case 30a and the inner shaft 30b. Therefore, when the first exciting current is supplied to the electromagnet 33, the four-wheel drive vehicle 12 travels in the four-wheel drive mode in which the propeller shaft 18 and the drive pinion shaft 19 are indirectly coupled to each other.

The level of the exciting current is associated with the level of the attraction force of the armature 35 generated by the electromagnet 33. When a second exciting current that is greater than the first exciting current is supplied to the electromagnet 33, the armature 35 is strongly attracted to the electromagnet 33. This increases the frictional force of the friction clutch 34, which increases the relative rotational speed of the first and second cam members 37, 38. The second cam member 38 is pressed forward even more strongly by the cam follower 39 that is displaced by the increase of the relative rotational speed. As a result, the main clutch mechanism 30c is brought into a coupled state. Therefore, when the second exciting current is supplied to the electromagnet 33, the four-wheel drive vehicle 12 travels in the four-wheel drive mode in which the propeller shaft 18 and the drive pinion shaft 19 are directly coupled.

A method for tuning the exciting current-transmission torque characteristic of the power transmission apparatus 11 will now be described.

First, the main clutch mechanism 30c, the cam mechanism 30e, the inner shaft 30b, the armature 35, the friction clutch 34, and the rear housing member 31b are mounted inside the front housing member 31a. Then, yokes 36 having several sizes are prepared. The yokes 36 are formed to provide the same second distances and different first distances. The electromagnet 33 is attached to each yoke 36.

The selected yoke 36 is mounted to the annular groove 53 of the rear housing member 31b. Then, while tuning the exciting current, the exciting current-transmission torque characteristic of the power transmission apparatus 11 is measured. If the exciting current-transmission torque characteristic is undesirable, the yoke 36 is exchanged with a larger yoke 36 to obtain satisfactory exciting current-transmission torque characteristic.

The operations of the power transmission apparatus 11 will now be described.

To tune the exciting current-transmission torque characteristic of the power transmission apparatus 11, one of the yokes 36, each of which provides different first distance, is selected and mounted to the power transmission apparatus 11. That is, in the preferred embodiment, the optimal yoke 36 is selected among the yokes 36, which vary the first distance only.

Therefore, as compared to the conventional power transmission apparatus, in which the optimal yoke is selected among the yokes, which vary the first and second distances, the tuning procedure of the exciting current-transmission torque characteristic is easily and accurately performed.

Figure 4:
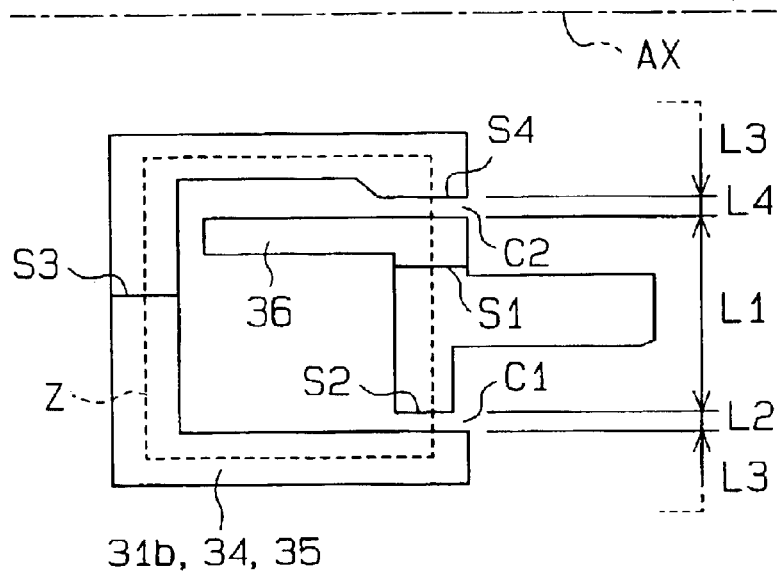
FIG. 4 is an explanatory diagram illustrating a magnetic path of the power transmission apparatus shown in FIG. 1.

The reasons will now be described with reference to FIG. 4 and the following equations.

A procedure for obtaining the following equations (12), (13) from the basic equations will be described.

The basic equation is expressed as follows:

$$\int HdL = N \times I$$

and $$B = \phi \div S$$

Symbols in the following equations represent the followings.

$\mu$ is the total permeability, $\mu s$ is the permeability of iron, $\mu o$ is the permeability of vacuum, I is the exciting current, N is the number of turns of coil, $\phi$ is the magnetic flux, Rm is the magnetoresistance, B is the magnetic flux density, and S is the cross-sectional area.

H is a magnetic field, which circulates the yoke 36, the first clearance C1, the rear housing member 31b, the friction clutch 34, the armature 35, the friction clutch 34, the rear housing member 31b, the second clearance C2, and the yoke 36.

L is a magnetic path length, which circulates the yoke 36, the first clearance C1, the rear housing member 31b, the friction clutch 34, the armature 35, the friction clutch 34, the rear housing member 31b, the second clearance C2, and the yoke 36.

H1 is a magnetic field, which passes through the yoke 36.

H2 is a magnetic field, which passes through the first clearance C1.

H3 is a magnetic field, which passes through the rear housing member 31b, the friction clutch 34, the armature 35, the friction clutch 34, and the rear housing member 31b.

H4 is a magnetic field, which passes through the second clearance C2.

L1 is the magnetic path length of the yoke 36.

L2 is the magnetic path length (first distance) of the first clearance C1.

L3 is the total magnetic path length of the rear housing member 31b, the friction clutch 34, the armature 35, the friction clutch 34, and the rear housing member 31b.

L4 is the magnetic path length (second distance) of the second clearance C2.

B1 is the magnetic flux density of the yoke 36.

B2 is the magnetic flux density of the first clearance C1.

B3 is the total magnetic flux density of the rear housing member 31b, the friction clutch 34, the armature 35, the friction clutch 34, and the rear housing member 31b.

B4 is the magnetic flux density of the second clearance C2.

S1 is the cross-sectional area of the yoke 36.

S2 is the cross-sectional area of the magnetic path at the first clearance C1.

S3 is the total cross-sectional area of the rear housing member 31b, the friction clutch 34, the armature 35, the friction clutch 34, and the rear housing member 31b.

S4 is the cross-sectional area of the magnetic path at the second clearance C2.

Description of Equations

The following basic equation (1) is obtained from the Maxwell equation.

$$\int HdL = N \times I \tag{1}$$

The following equation (2) is obtained by analyzing the left side of the basic equation (1).

$$H1 \times L1 + H2 \times L2 + H3 \times L3 + H4 \times L4 = N \times I \tag{2}$$

On the other hand, the basic equation (3) is obtained by Lenz's Law.

$$B = \mu \times H = \phi \div S \tag{3}$$

The following equations (4) to (7) are obtained by analyzing the equation (3).

$$B1 = \mu s \times H1 = \phi \div S1 \tag{4}$$

$$B2 = \mu 0 \times H2 = \phi \div S2 \tag{5}$$

$$B3 = \mu s \times H3 = \phi \div S3 \tag{6}$$

$$B4 = \mu 0 \times H4 = \phi \div S4 \tag{7}$$

The equations (4) to (7) can be rewritten as equations (8) to (11).

$$H1 = \phi \div (\mu s \times S1) \tag{8}$$

$$H2 = \phi \div (\mu 0 \times S2) \tag{9}$$

$$H3 = \phi \div (\mu s \times S3) \tag{10}$$

$$H4 = \phi \div (\mu 0 \times S4) \tag{11}$$

The equations (8) to (11) are substituted into the equation (2) to obtain an equation (12).

$$(L1 \div (\mu s \times S1) + L2 \div (\mu 0 \times S2) + L3 \div (\mu s \times S3) + L4 \div (\mu 0 \times S4)) = N \times I \div \phi \quad (12)$$

Since the left side of the equation (12) is equal to the magnetoresistance Rm, the following equation (13) is obtained.

$$(L1 \div (\mu s \times S1) + L2 \div (\mu 0 \times S2) + L3 \div (\mu s \times S3) + L4 \div (\mu 0 \times S4)) = Rm \quad (13)$$

The following equation (14) is obtained by substituting the equation (13) into the equation (12).

$$\phi = N \times I \div Rm \quad (14)$$

The tuning of the exciting current-transmission torque characteristic will now be described based on the equation (14).

In the equation (14) when the exciting current I increases, the magnetic flux φ is increased. Thus, the electromagnet 33 strongly attracts the armature 35, thereby increasing the frictional force of the friction clutch 34. Accordingly, the transmission torque between the outer case 30a and the inner shaft 30b is increased. That is, when the exciting current I increases, the transmission torque between the outer case 30a and the inner shaft 30b increases.

Therefore, when the value of the exciting current I increases, the electromagnet 33 strongly attracts the armature 35. Thus, the frictional force of the friction clutch 34 is increased and the power transmission between the front housing member 31a and the inner shaft 30b is increased. That is, the transmission torque of the power transmission apparatus 11 is tuned in accordance with the exciting current I.

In the equation (13), when one of the magnetic path length L2 and the magnetic path length L4 is varied by a predetermined value, the variation amount of the magnetoresistance Rm is smaller when the magnetic path length L2 is varied since the first clearance cross-sectional area S2 is greater than the second clearance cross-sectional area S4. That is, when the magnetic path length L2 is varied, the resistance value of the magnetoresistance Rm slightly changes, and when the magnetic path length L4 is varied, the resistance value of the magnetoresistance Rm changes by a large amount.

When tuning the magnetoresistance Rm to obtain a desired exciting current-transmission torque characteristic, yokes having different magnetic path lengths L2 and L4 are used in the conventional power transmission apparatus. Thus, both magnetic path lengths L2 and L4 (first and second distances) are varied, thereby changing the magnetoresistance Rm and the transmission torque by a relatively large amount. The inner circumferential surface and the outer circumferential surface of each conventional yoke are required to be cut such that the magnetic path lengths L2 and L4 are equal.

On the contrary, in the preferred embodiment, only the magnetic path length L2 (first distance) is changed when the yoke 36 is replaced. Thus, the variation amount of the magnetoresistance Rm is relatively small and the variation amount of the transmission torque is relatively small. Therefore, the transmission torque is tuned more accurately.

Figure 5:
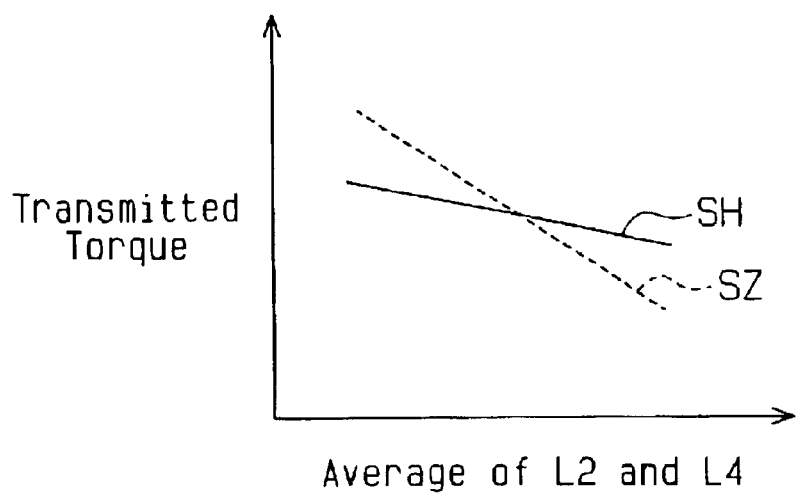
FIG. 5 is a graph showing the relationship between the torque and a magnetic path clearance, the vertical axis of which representing the torque and the horizontal axis representing the average value of first and second magnetic path clearances.

The horizontal axis of FIG. 5 represents the average value of the first distance and the second distance, and the vertical axis represents the torque transmitted from the power transmission apparatus 11 to the drive pinion shaft 19. The exciting current-transmission torque characteristic of the preferred embodiment is shown by a straight line SH and the exciting current-transmission torque characteristic of the conventional power transmission apparatus is shown by a straight line SZ.

According to FIG. 5, the variation of the transmission torque of the power transmission apparatus 11 of the preferred embodiment is gradual as compared to the conventional power transmission apparatus. Therefore, the variation of the fine-tuned transmission torque is reduced.

Figure 6:
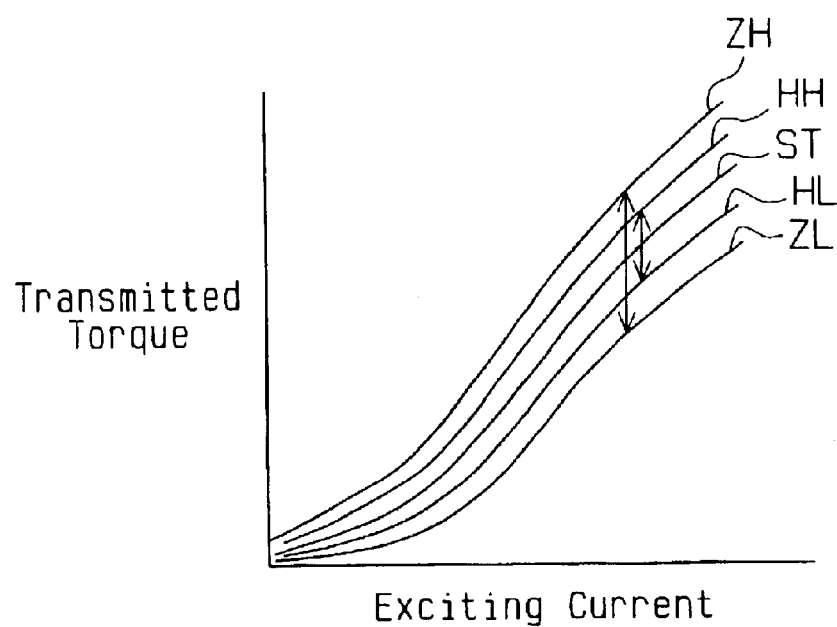
FIG. 6 is a graph showing the relationship between the exciting current and the torque.

The horizontal axis of FIG. 6 represents the exciting current of the electromagnet 33 and the vertical axis represents the transmission torque of the power transmission apparatus 11.

The desired exciting current-transmission torque characteristic is shown by a curved line ST. Curved lines ZH and ZL show the upper and lower limits of the characteristic of the power transmission apparatus tuned by the conventional tuning method. A curved line HH and a curved line HL show the upper and lower limits of the characteristic of the power transmission apparatus 11 tuned by the tuning method according to the preferred embodiment. That is, the exciting current-transmission torque characteristic of the power transmission apparatus 11 of the preferred embodiment lies between the curved lines HH and HL. That is, the exciting current-transmission torque characteristic of the power transmission apparatus 11 of the preferred embodiment lies between the curved lines HH and HL, and the variation is less than the conventional power transmission apparatus. In other words, the tuning accuracy of the exciting current-transmission torque characteristic is higher when only the first distance is varied than when both the first and second distances are varied.

The power transmission apparatus 11 of the preferred embodiment provides the following advantages.

(1) The exciting current-transmission torque characteristic of the power transmission apparatus 11 is tuned by selecting one yoke 36 that applies preferable exciting current-transmission torque characteristic among the yokes 36, which apply different first distances. Therefore, the power transmission apparatus 11 of the preferred embodiment easily fine-tunes the magnetoresistance Rm of the magnetic path Z. Thus, the tuning variation of the exciting current-transmission torque characteristic is reduced. As a result, as compared to the conventional power transmission apparatus, in which yokes that changes the first and second distances are used, the exciting current-transmission torque characteristic is easily tuned and a power transmission apparatus having reduced variation of exciting current-transmission torque characteristic is obtained.

(2) The first distance and the second distance need not be the same in the preferred embodiment. This reduces the troublesome procedure of machining the yokes such that the first and second distances are equal.

(3) The first clearance cross-sectional area S2 is greater than the second clearance cross-sectional area S4 in the preferred embodiment. As a result, when the second distance is not changed and only the first distance is changed by the predetermined value, the variation of the exciting current-transmission torque characteristic is gradual as compared to a case in which the first and second distances are varied by the predetermined value.

The preferred embodiment may be modified as follows.

In the preferred embodiment, the first distance is changed to tune the exciting current-transmission torque characteristic such that the first distance is set longer than the second distance. However, the first distance may be changed to tune the exciting current-transmission torque characteristic such that the first distance is shorter than the second distance.

The clearance formed along the entire outer circumferential surface of the yoke 36 may be the second clearance C2 and the clearance formed along the entire inner circumferential surface of the yoke 36 may be the first clearance C1. In this case also, the first clearance cross-sectional area S2 is preferably larger than the second clearance cross-sectional area S4. The exciting current-transmission torque characteristic is tuned by mounting one of the yokes 36 that apply different first distances.

Therefore, the present examples and embodiments are to be considered as illustrative and not restrictive and the invention is not to be limited to the details given herein, but may be modified within the scope and equivalence of the appended claims.

What is claimed is:

1. A tuning method for the exciting current-transmission torque characteristic of a power transmission apparatus, wherein the power transmission apparatus comprises:

an outer rotary member having a groove;

an inner rotary member, which is arranged to rotate relative to the outer rotary member;

a friction clutch located between the inner and outer rotary members;

an electromagnetic drive apparatus for driving the friction clutch when receiving an exciting current, wherein the electromagnetic drive apparatus includes an electromagnet that is energized by the exciting current and an armature, the electromagnet and the armature being located on opposite sides of the friction clutch; and a yoke, which supports the electromagnet, wherein part of the yoke and the electromagnet are located in the groove, and wherein a first clearance and a second clearance are formed between the yoke and inner surfaces of the groove, wherein there is a first distance between the yoke and the groove at the first clearance and a second distance between the yoke and the groove at the second clearance, the tuning method comprising:

changing the first distance while maintaining the second distance constant.

2. The tuning method according to claim 1, wherein the energized electromagnet generates a magnetic path, which passes through the first clearance with a first cross-sectional area and passes through the second clearance with a second cross-sectional area, wherein the first cross-sectional area is greater than the second cross-sectional area.

* * * * *